Figure 3:
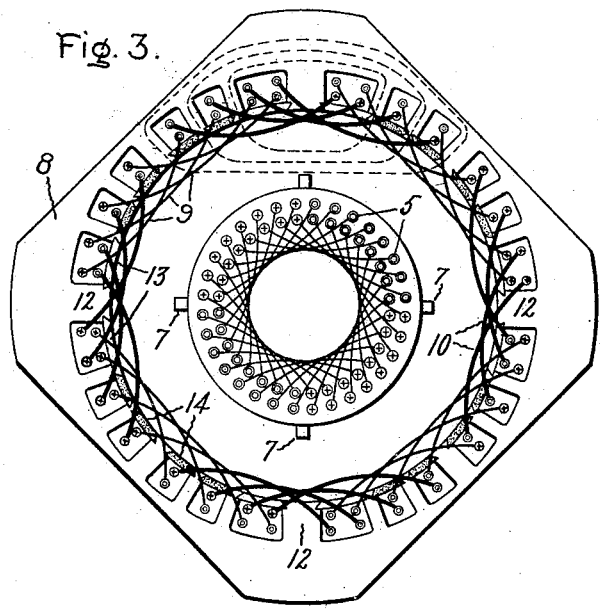

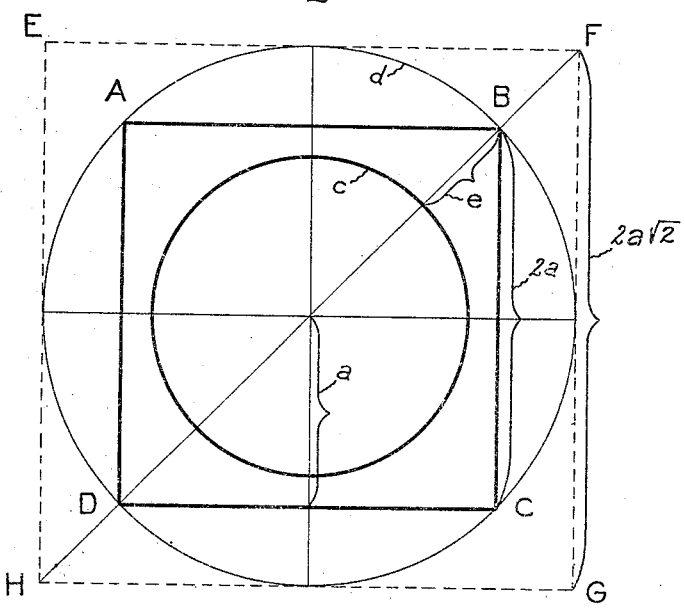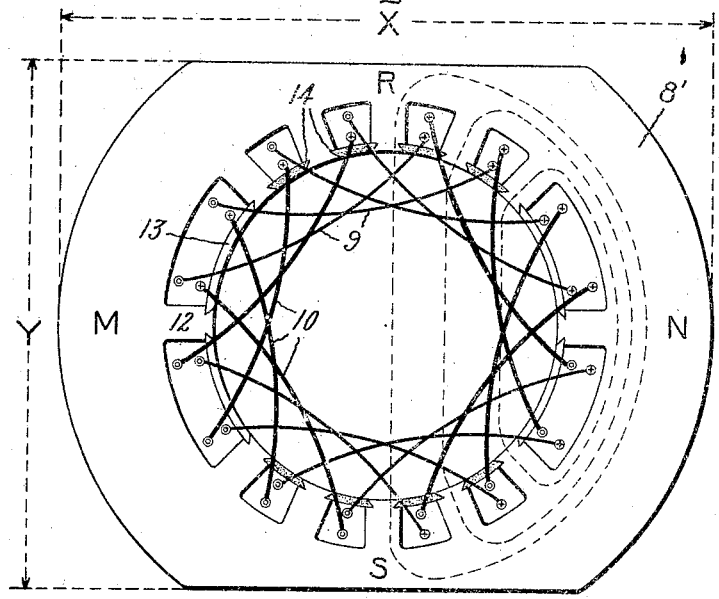

S. R. BERGMAN.
DYNAMO ELECTRIC MACHINE.
APPLICATION FILED AUG. 17, 1914.

1,173,089.

Patented Feb. 22, 1916.
2 SHEETS—SHEET 2.

Witnesses:
Helen Orford
Max Weisbrod

Inventor:
Sven R. Bergman,
by
His Attorney.

UNITED STATES PATENT OFFICE.

SVEN R. BERGMAN, OF LYNN, MASSACHUSETTS, ASSIGNOR TO GENERAL ELECTRIC COMPANY, A CORPORATION OF NEW YORK.

DYNAMO-ELECTRIC MACHINE.

1,173,089. Specification of Letters Patent. Patented Feb. 22, 1916.

Continuation in part of application Serial No. 501,050, filed June 9, 1909. This application filed August 17, 1914. Serial No. 857,083.

*To all whom it may concern:*

Be it known that I, SVEN R. BERGMAN, a subject of the King of Sweden, residing at Lynn, in the county of Essex, State of Massachusetts, have invented certain new and useful Improvements in Dynamo-Electric Machines, of which the following is a specification.

My invention relates to direct current dynamo-electric machines, and more particularly to a direct current dynamo-electric machine having a distributed exciting winding.

The present application is a continuation part of my application filed June 9, 1909, Serial No. 501,050.

The object of my invention is to provide a novel form of field magnet for use in a direct current dynamo electric machine having a distributed exciting winding.

More particularly the object of my invention is to provide a field magnet for direct current machines of the type to which my invention relates, in which the magnetic material is most advantageously and economically distributed and proportioned.

The novel features which I believe to be patentably characteristic of my invention are definitely pointed out in the claims appended hereto.

The novel features of my invention and the design of field magnets embodying these features will be understood from the following description taken in connection with the accompanying drawings, in which:

Figure 1 is an explanatory diagrammatic view; Fig. 2 is a diagrammatic end view of the field magnet of a two-pole machine embodying my invention; and Figs. 3 and 4 are diagrammatic end views of the field magnets of four-pole and six-pole machines, respectively, embodying my invention.

The type of dynamo-electric machine to which my invention relates employs a completely distributed exciting winding. The magnetic material of the field magnet is completely distributed around the armature of the machine to form a substantially uniform air-gap, and is provided on its inner periphery with distributed slots for the exciting winding. I have herein illustrated my invention applied to a compensated direct current machine of the type disclosed in my application for Letters Patent filed June 9, 1909, Serial No. 501,050, and in a continuation of the latter application filed Aug. 21, 1914, Serial No. 857,851. The compensated direct current machine described and claimed in the aforementioned applications comprises a substantially full-pitch armature winding and completely distributed exciting and compensating windings each of substantially fifty per cent., or one-half pitch. My present invention, however, is not confined to this particular type of machine, but is applicable to any dynamo-electric machine having a distributed exciting winding and particularly a distributed lap winding.

Figure 4:
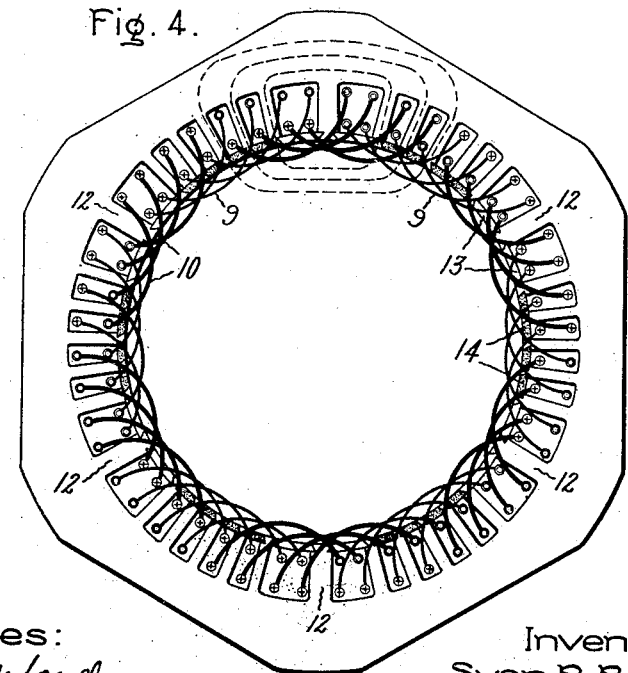

Fig. 3 of the drawings illustrates my invention applied to a four-pole compensated direct current dynamo-electric machine. The armature member of the machine comprises a commuted armature winding diagrammatically represented by the conductors 5. The armature winding is a full-pitch winding, as clearly indicated by the end connections of the coils. Brushes 7 are operatively related to the armature winding commutator in the well known manner. The field magnet 8 of the machine has its magnetic material distributed around the armature to form a substantially uniform air-gap, and has a slotted circular inner periphery. The outer periphery of the field magnet has an approximately polygonal configuration, the advantages of which will be more definitely pointed out hereinafter. Two sets of coils 9 and 10 are carried in the slots in the field magnet. These coils are uniform in shape and dimensions, but are wound with wire of different cross-section, since one set of coils is connected as an exciting winding in shunt to the armature winding, while the other set of coils is connected as a compensating winding in series relation with the armature winding. The current distribution in the conductors of the several windings is shown in the figures by means of the usual convention, in which crosses and circles applied to the conductors indicate, respectively, that the current is flowing away from and toward the observer. The exciting or shunt coils 9 are shown in light lines, and the coils 10 of the compensating winding are shown in heavy lines.

It will be seen that both compensating and exciting windings are completely distributed, so that each slot contains coils of each winding. By observing the direction of current flow in the conductors of the shunt coils 9 of Fig. 3, indicated by the crosses and circles, it will be seen that four poles are produced. It will further be seen that the compensating winding 10 similarly produces four poles, which are displaced 45 physical or 90 electrical degrees from the poles of the exciting winding. Thus the exciting and compensating windings are arranged somewhat like the two phases of the winding of a two-phase induction motor, except that each winding is completely distributed instead of being distributed over only 50 per cent. of the periphery, as is common in a two-phase induction motor. The coils of the exciting and compensating windings are of 50 per cent. pitch, whereby a material saving in copper is effected by the shortened end connections.

It will be seen that while the inner periphery of the field magnet is circular, the outer periphery is polygonal and approximately square, and that the poles produced by the exciting winding occur at points on the inner periphery opposite the centers of the sides of the polygon formed by the external periphery. This arrangement results in using the magnetic material very efficiently, as is shown by a consideration of the flux distribution. It will be evident that the flux distribution produced by the exciting winding is as shown by dotted lines in Figs. 2, 3, and 4 of the drawings. As appears in these figures, the maximum flux passes through those parts of the field magnet where the cross section of magnetic material is greatest. The magnetizing effect of the compensating winding is opposed by that of the armature winding, so that flux distribution due to the compensating winding need not be considered.

Reference to Fig. 1 of the drawings will better illustrate the economic character of a field magnet of the configuration and proportions hereinbefore described. A four-pole machine is assumed for the purposes of illustration, and it is further assumed that the total flux penetrates the cross section $e$. If a magnetic circuit of uniform cross section were used, the annular space between the two concentric circles $c$ and $d$ would represent the field magnet member. This annular magnetic member must be punched from a substantially square steel sheet EFGH, in which case the corners of the square EFGH are wasted. If a distributed exciting winding is employed and the poles are arranged in accordance with my invention, the square ABCD satisfactorily meets all the requirements of the field magnet. If $2^a$ represents the length of each side of the square ABCD, then $2a\sqrt{2}$ represents the length of each side of the square EFGH. The ratio of magnetic material in the square member ABCD and in the square EFGH, from which the annular member included between the circles $c$ and $d$ must be punched, is then represented as follows:

$$\left(\frac{2a}{2a\sqrt{2}}\right)^2 = 1/2$$

Accordingly, if the poles are arranged in accordance with my invention, a saving of substantially fifty per cent. in the material of the field magnet member is effected.

Fig. 2 illustrates a two-pole dynamo-electric machine embodying the features of my invention. The slotted circular inner periphery of the field magnet 8' of the machine carries a compensating winding 10 and a shunt exciting winding 9, of the same character as described in connection with Fig. 3. The outer periphery of the field magnet is oblong. From the figure it will be seen that the total flux passes through the field magnet at M and N, where the cross section of the magnet is large, whereas at the portions R and S the flux density in the magnet is, theoretically, zero. Thus it is obvious that we can make the cross sectional area of the magnet at R and S very small, and the dimensions of the magnet are governed by the required cross section at M and N. If the field magnet were made along standard lines, using a uniform cross sectional area, it would be necessary to make a circular punching from a square steel sheet, having a side equal to X. In accordance with my invention, only a rectangular sheet having the sides X and Y are required, whereby a saving is effected in the ratio of Y to X.

Fig. 4 of the drawings diagrammatically illustrates my invention embodied in a six-pole machine. It will be observed that the outer periphery of the field magnet is hexagonal in this instance. The distribution of the flux in the field magnet will be readily understood from the figure, in view of the foregoing description.

In Figs. 3 and 4 it will be observed that the corners of the outer periphery of the field magnet are slightly cut away, to give each corner an arcual configuration. In Fig. 2 the shorter sides of the oblong figure are similarly arcual. This particular configuration of the field magnet facilitates the assembling of the magnet in the frame of the motor, which is generally circular, and is disclosed in an application filed by me January 12th, 1911, Serial No. 602,205.

In Figs. 2, 3, and 4, I have shown the inner periphery of the field magnet provided with definite commutating teeth 12, there being one commutating tooth per pole. Each commutating tooth is separated from the adjacent tooth on each side thereof by a relatively wide slot, and each of the relatively wide slots is closed with a non-magnetic wedge 13, while each of the other slots in the field magnet is closed by a magnetic wedge 14. This construction of the particular type of machine in connection with which I have illustrated my present invention is described and claimed in my aforementioned application, filed Aug. 21, 1914, Serial No. 857,851.

It will be observed that a field magnet constructed in accordance with my invention has an approximately polygonal outer periphery and a slotted circular inner periphery. The described lap winding which I employ to furnish the exciting field of the motor produces a flux distribution peculiarly adapted to be carried by a field magnet of the configuration and proportions hereinbefore described. It will be observed that the exciting winding is arranged to produce magnetic poles on the inner periphery of the field magnet at points where the cross sectional area of the magnetic material of the field magnet is substantially a minimum. The distributed uniform lap winding produces magnetic poles in which the flux density of the pole faces varies generally as a sine curve from a maximum at the center of a pole face to zero intermediate two poles. The field magnet of my invention is of such configuration and so proportioned that the portions of the magnet of minimum cross sectional area substantially coincide with the portions of the pole faces of maximum flux density, and the portions of the magnet of maximum cross sectional area occur between adjacent poles.

It will, of course, be understood that my invention is not limited to the particular type of compensated direct current dynamo-electric machine in connection with which the invention is herein illustrated. Thus, while I have explained my invention by illustrating and describing a specific embodiment thereof, it will be understood that the invention may be embodied in many other forms than that shown and described. I, accordingly, do not wish to be restricted to the particular form and construction disclosed herein by way of example for the purpose of setting forth my invention in accordance with the Patent Statutes. The terms of the appended claims are, therefore, not restricted to the precise structure disclosed, but are intended to cover all changes and modifications within the spirit and scope of my invention.

What I claim as new and desire to secure by Letters Patent of the United States, is:—

1. In direct current dynamo-electric machine, a field magnet having an approximately polygonal outer periphery and a slotted circular inner periphery, and a distributed exciting winding carried in the slots of said field magnet and producing magnetic poles at points on the inner periphery of the field magnet opposite the centers of the sides of the polygon formed by the outer periphery, said exciting winding being composed of uniform coils arranged to form a lap winding.

2. In a direct current dynamo-electric machine, a field magnet having an approximately polygonal outer periphery and a slotted circular inner periphery, and a distributed exciting winding carried in the slots of said field magnet and producing magnetic poles on the inner periphery of the field magnet at points where the cross sectional area of the magnetic material of the field magnet is substantially a minimum, said exciting winding being so arranged that it produces a flux having substantially a sine wave form.

3. In a direct current dynamo-electric machine, a field magnet having a slotted circular inner periphery, and a distributed exciting winding composed of uniform coils carried in the slots of said field magnet and arranged as a lap winding, the magnetic material of the field magnet being of such configuration and so proportioned that the maximum flux flows through those portions of the field magnet of maximum cross sectional area and the minimum flux flows through those portions of the field magnet of minimum cross sectional area.

4. In a direct current dynamo-electric machine, a field magnet having a slotted circular inner periphery, and a distributed exciting winding carried in the slots of said field magnet and arranged to produce magnetic poles on the inner periphery of the field magnet, said exciting winding being composed of uniform coils arranged to form a lap winding which produces a flux having substantially a sine wave form, said field magnet having an approximately polygonal outer periphery of such configuration and proportions that the portions of the field magnet of minimum cross sectional area substantially coincide with the centers of the magnetic poles produced by said exciting winding on the inner periphery of the field magnet.

5. In a direct current dynamo-electric machine, a field magnet having an approximately polygonal outer periphery and a slotted circular inner periphery, and an exciting winding carried in said slots and arranged to produce magnetic poles on the inner periphery of the field magnet, the exciting winding being a distributed uniform lap winding so arranged that the flux density of each pole varies generally as a sine curve from a maximum at the center of the pole to zero intermediate two poles, and the field magnet being of such configuration and so proportioned that the portions of the field magnet of minimum cross sectional area substantially coincide with the portions of the poles of maximum flux density, and the portions of the field magnet of maximum cross sectional area occur between adjacent poles.

6. A direct current dynamo-electric machine comprising a field magnet having an approximately polygonal outer periphery and a slotted inner periphery, and an exciting winding composed of uniform coils carried in said slots and arranged as a lap winding for producing magnetic poles on the inner periphery of the field magnet, the axis of said magnetic poles being substantially coincident with the centers of the sides of the polygon formed by the outer periphery of the field magnet.

In witness whereof, I have hereunto set my hand this 15th day of August, 1914.

SVEN R. BERGMAN.

Witnesses:
MERTON W. SAGE,
HELEN ORFORD.